(12) United States Patent
Makover et al.

(10) Patent No.: US 8,505,477 B2
(45) Date of Patent: Aug. 13, 2013

(54) SYSTEM FOR APPLYING HOT MELT ADHESIVE POWDER ONTO A NON-METALLIC OBJECT SURFACE

(75) Inventors: Jakov Makover, Maccabim (IL); Bar Cochva Mardix, Tel Avlv (IL); Yaacov Sadeh, Rechovot (IL)

(73) Assignee: Orisol Asia Ltd., Chang Hwa (TW)

( * ) Notice: Subject to any disclaimer, the term of this patent is extended or adjusted under 35 U.S.C. 154(b) by 0 days.

(21) Appl. No.: 13/545,980

(22) Filed: Jul. 11, 2012

(65) Prior Publication Data

US 2012/0272899 A1 Nov. 1, 2012

Related U.S. Application Data

(62) Division of application No. 12/530,199, filed on Sep. 4, 2009, now abandoned.

(51) Int. Cl.
*B05C 19/00* (2006.01)
*B05C 11/00* (2006.01)
*B05B 15/12* (2006.01)
*B05B 13/02* (2006.01)
*B05B 5/00* (2006.01)

(52) U.S. Cl.
USPC ........... 118/308; 118/309; 118/324; 118/641; 118/643; 118/58; 118/72; 118/73

(58) Field of Classification Search
USPC .................. 118/324, 308, 309, 620–643, 58, 118/326, 66, 72–74; 427/457–486; 156/283
See application file for complete search history.

(56) References Cited

U.S. PATENT DOCUMENTS

| | | | | |
|---|---|---|---|---|
| 2,706,698 | A * | 4/1955 | Daly et al. | 156/196 |
| 3,671,373 | A * | 6/1972 | Grewe | 428/90 |
| 4,156,652 | A * | 5/1979 | Wiest | 422/186.3 |
| 6,214,421 | B1 * | 4/2001 | Pidzarko | 427/475 |

* cited by examiner

*Primary Examiner* — Yewebdar Tadesse

(57) ABSTRACT

A system for applying hot melt adhesive powder onto a non-metallic object surface comprises a convey belt, a radiation chamber, a spraying chamber and a heating chamber. The convey belt is used to deliver a non-metallic object treated by a cleaning agent and a conductive liquid through the radiation chamber where the surface of the non-metallic objected is irradiated by ultraviolet rays and ozone and then through the spraying chamber where the surface of the non-metallic object is sprayed with charged hot melt adhesive powder, and finally into the heating chamber where the hot melt adhesive powder attached onto the non-metallic object will be melted into a liquid adhesive film ready to be bonded.

6 Claims, 1 Drawing Sheet

SYSTEM FOR APPLYING HOT MELT ADHESIVE POWDER ONTO A NON-METALLIC OBJECT SURFACE

This application is a divisional application of U.S. patent application Ser. No. 12/530,199, which claims the benefit of the earlier filing date of Sep. 4, 2009 now abandoned. Claims 1-6 of this application are the same as the previous claims 5-10 of the U.S. patent application Ser. No. 12/530,199.

BACKGROUND OF THE INVENTION

1. Field of the Invention

The present invention relates to a system for using hot melt adhesive powder to bond two non-metallic objects; and more particularly to a system for applying hot melt adhesive powder onto a non-metallic object surface.

2. Description of the Prior Art

Conventional ways of bonding two non-metallic objects are mostly to apply liquid adhesive on the to-be-bonded areas of the non-metallic objects so as to bond them together. The to-be-bonded areas don't have uniform shapes, it requires manual effort to apply adhesive, so it is labor-intensive. For example, the gluing of shoe parts and sole parts or the gluing of soles to uppers includes steps of manually applying solvent based liquids onto the shoe parts, manually applying the liquid water or solvent based adhesives, and consuming high level of energy to evaporate the water or other non adhesive fluid. Since a common solvent based adhesive contains some toxic substances, such as benzene, formaldehyde, and etc, the working environment is bad for the health of the workers.

The present invention has arisen to mitigate and/or obviate the afore-described disadvantages.

SUMMARY OF THE INVENTION

The primary objective of the present invention is to provide a system for applying hot melt adhesive powder onto a non-metallic object surface which can save energy, reduce the working space, reduce the labor intensity and improve the working environment by making the spraying and the melting operation of the hot melt adhesive carry out automatically.

In order to achieve the above objective, the system for applying hot melt adhesive powder onto a non-metallic object surface comprises:

A convey belt is located under the radiation chamber, the spraying chamber and the heating chamber for delivering an object into the radiation chamber, the spraying chamber and the heating chamber in order.

A radiation chamber is located above the convey belt and installed with at least one ultraviolet ray lamp at an upper side thereof, the radiation chamber is further provided with a ozone generator, the radiation chamber irradiates the to-be-bonded object by ultraviolet rays and ozone.

A spraying chamber is located above the convey belt and installed with at least one spray head at an upper side thereof, the spray head sprays charged hot melt adhesive powder onto a surface of the to-be-bonded object, the spraying chamber is further provided with at least one blowing device at a proper position to remove away the hot melt adhesive powder outside a to-be-bonded area on the surface of the to-be-bonded object.

A heating chamber is located above the convey belt and provided with a heating device to generate heat to melt the hot melt adhesive powder.

As compared to the existing technology, the present invention has the following advantages: the hot melt adhesive powder can be automatically sprayed and automatically melt in the respective chambers without manual operations, thus enhancing the automation degree, reducing the labor intensity, saving the energy and reducing the operation space. In addition, the system of the present invention is provided with the powder-recycling chamber to prevent the escape of the powder, enhancing the utilization ratio of the powder, avoiding the environmental pollution, and protecting the health of the workers.

DETAILED DESCRIPTION OF THE PREFERRED EMBODIMENTS

Figure 1:
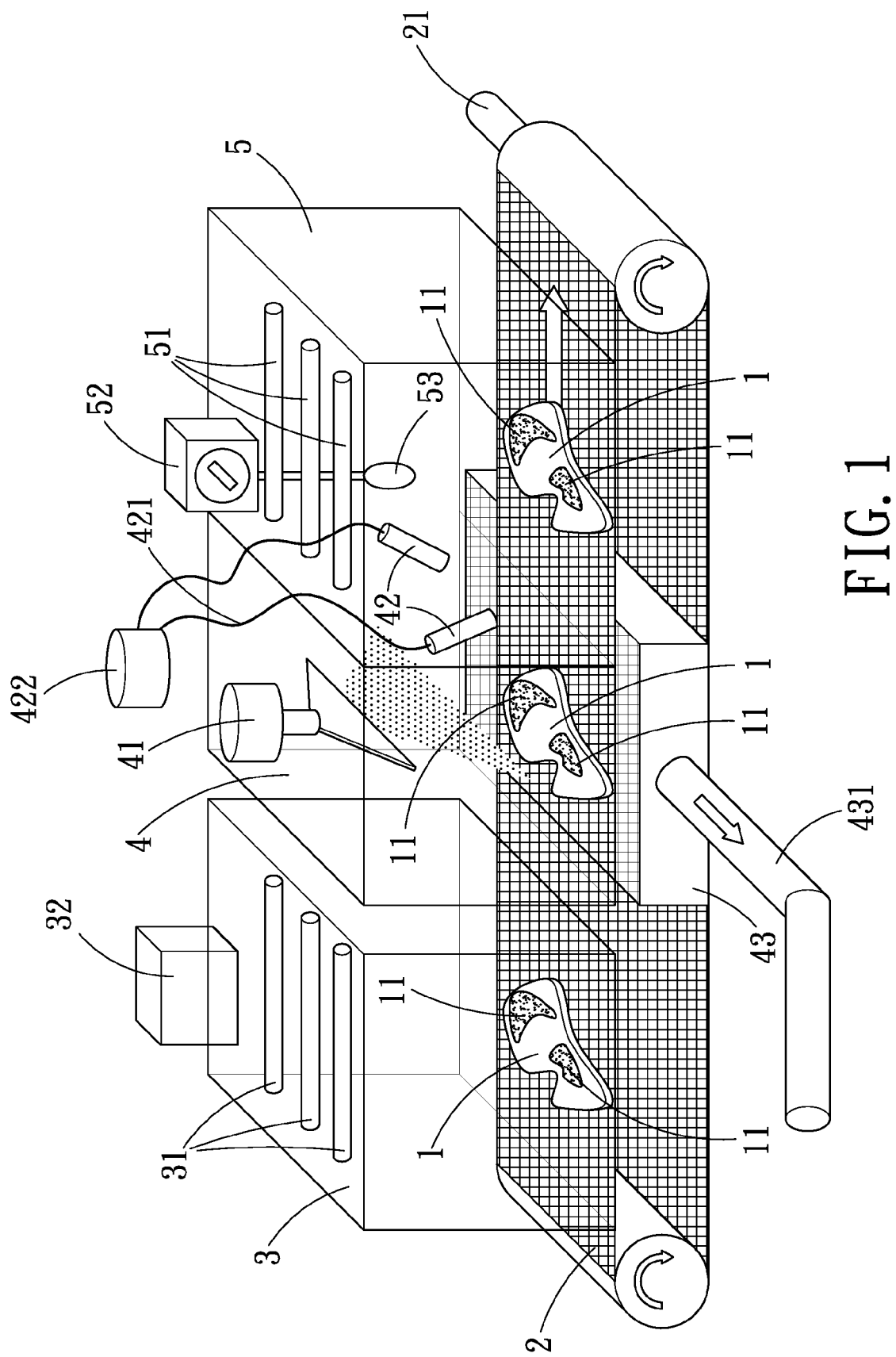
FIG. 1 is a schematic view illustrating a system for applying hot melt adhesive powder onto a non-metallic object surface.

The present invention will be clearer from the following description when viewed together with the accompanying drawings, which show, for purpose of illustrations only, the preferred embodiment in accordance with the present invention.

FIG. 1 illustrates a system for applying hot melt adhesive powder onto a non-metallic object surface.

The system for applying hot melt adhesive powder onto a non-metallic object surface comprises a convey belt 2, a radiation chamber 3, a spraying chamber 4 and a heating chamber 5.

A method for using the system to apply hot melt adhesive powder onto a non-metallic object surface comprises the steps of:

A. applying cleaning agent: a cleaning agent (available on the market) is applied onto a to-be-bonded non-metallic object surface (in the present embodiment, onto a to-be-bonded area 11 of a surface of the shoe part 1) by a brush or a spraying gun;

B. applying conductive liquid: a conductive liquid (available on the market) is applied onto the to-be-bonded area 11 by a brush or a spraying gun, and then the shoe part 1 which is coated with the conductive liquid will be placed on the convey belt 2 which is driven by a variable speed motor 21 or a driver;

C. radiating: the surface of the shoe part 1 is irradiated in the radiation chamber 3 for an adequate time by ultraviolet rays and ozone, the radiation chamber 3 is located above the convey belt 2, the shoe part 1 is delivered into the radiation chamber 3 by the convey belt 2, the radiation chamber 3 is provided with at least one ultraviolet lamp 31, optimally UV-C lamp (three in the present embodiment) inside thereof to irradiate the shoe part 1, the radiation chamber 3 is further provided with an ozone generator 32 to provide ozone into the radiation chamber 3 to make the UV radiation carry out in the ozone environment to enhance the radiation effect, the ozone level inside the chamber 3 can be controlled by the ozone generator 32, the to-be-bonded area 11 of the shoe part 1 can receive better radiation effect than the non-cleaned part, the speed of the convey belt 2 is adjusted according to the length of the radiation chamber 3 to ensure the shoe part 1 to be irradiated for an adequate time;

D. spraying hot melt adhesive powder: the hot-met adhesive powder is a copolyamid, optimally a polyurethane hot melt adhesive powder, which can be melted at a given temperature, the spraying chamber 4 is located above the convey belt 2, and the shoe part 1 which has been subjected to radiation will be delivered into the spraying chamber 4 by the convey belt 2, the spraying chamber 4 is provided with at least one spray head 41 (one in the present embodiment) at an upper side thereof. The spray head 41 can charge the hot-met adhesive powder with electrostatic charges and be connected to an air pressurized powder chamber (not shown). The air pressurized powder chamber can deliver the hot melt adhesive powder to the spray head 41 by air pressure first, and then the hot-met adhesive will be charged with the electrostatic charges by the spray head 41 and subsequently sprayed onto the surface of the shoe part 1, since the to-be-bonded area 11 is coated with the conductive liquid, the hot-met adhesive powder can be securely adhered onto the to-be-bonded area 11 under the effect of the static magnetic field, the spraying speed and the number of the spray heads 41 can be set according to the speed of the convey belt 2 to ensure the hot melt adhesive powder to adequately cover the surface of the shoe part 1, the spraying chamber 4 is further provided with at least one blowing device along the convey belt 2 (two air nozzles 42 in the present embodiment), after the hot melt adhesive powder is sprayed onto the surface of the shoe part 1, the air nozzles 42 can blow away the hot melt adhesive powder outside the to-be-bonded area 11 on the surface of the shoe part 1, the air nozzles 42 are connected to the air pump 422 through air supplying pipes 421, the flow speed and the number of the air nozzles 42 can be set according to the speed of the convey belt, and the direction of the air nozzles can be adjusted according to the position of the shoe part 1 to ensure the hot melt adhesive powder outside the to-be-bonded area 11 on the surface of the shoe part 1 to be removed completely, in order to recycle the hot melt adhesive powder which is blew down onto the convey belt 2, under the spraying chamber 4 and the convey belt 2 is disposed a powder-recycling chamber 43 that is connected to an air pressurized powder chamber (not shown) to recycle the hot melt adhesive powder into the air pressurized powder chamber for reuse by means of vacuum;

E. heating: the heating chamber 5 is located above the convey belt 2, the heating chamber 5 heats the hot melt adhesive powder on the to-be-bonded area 11 of the shoe part 1 by means of direct radiation of infrared light, hot air flow, or microwave heating until the powder is melt. In the present embodiment, the heating chamber 5 is provided with infrared lamps 51 at an upper side thereof. The number of the infrared lamps 51 is set according to the temperature required for melting the hot melt adhesive powder and the speed of the convey belt 2. The temperature of the heating chamber 5 can be adjusted by a thermostat 52 disposed which controls the ON and OFF of the infrared lamps 51. The thermostat 52 can be installed on the inner surface of the heating chamber 5 or outside the heating chamber 5, optimally outside the heating chamber 5. The thermostat 52 is connected to a temperature sensor 53 disposed in the heating chamber 5 to control the temperature in the heating chamber 5. After being heated by the heating chamber 5, the hot melt adhesive powder on the to-be-bonded area 11 of the shoe part 1 will absorb the heat and then be melted into a liquid adhesive film ready to be bonded.

After the hot melt adhesive powder on the to-be-bonded area 11 of the shoe part 1 is melted, the shoe part 1 will be delivered by the convey belt 2 to be bonded to other shoe parts.

The above steps A and B can be combined into a single step by using a mixture of cleaning agent and conductive liquid, such that the operation process can be simplified, saving the operation time.

With the above method and system, the hot melt adhesive powder can be automatically sprayed and melted without manual operation, enhancing the automation degree, reducing the labour intensity and saving the energy. In addition, the system of the present invention is provided with the powder-recycling chamber to prevent the escape of the powder, enhancing the utilization ratio of the powder, avoiding the environmental pollution, and protecting the health of the workers.

While we have shown and described various embodiments in accordance with the present invention, it is clear to those skilled in the art that further embodiments may be made without departing from the scope of the present invention.

What is claimed is:

1. A system for applying hot melt adhesive powder onto a non-metallic object surface comprising: a convey belt, a radiation chamber, a spraying chamber and a heating chamber; characterized in that:
   the convey belt is located under the radiation chamber, the spraying chamber and the heating chamber for delivering a to-be-bonded object into the radiation chamber, the spraying chamber and the heating chamber in order;
   the radiation chamber is located above the convey belt and installed with at least one ultraviolet ray lamp at an upper side thereof, the radiation chamber is further provided with a ozone generator, the radiation chamber irradiates the to-be-bonded object by ultraviolet rays and ozone;
   the spraying chamber is located above the convey belt and installed with at least one spray head at an upper side thereof, the at least one spray head sprays charged hot melt adhesive powder onto a surface of the to-be-bonded object, the spraying chamber is further provided with at least one blowing device at a proper position to remove away the hot melt adhesive powder outside a to-be-bonded area on the surface of the to-be-bonded object;
   the heating chamber is located above the convey belt and provided with a heating device to generate heat to melt the hot melt adhesive powder.

2. The system for applying hot melt adhesive powder onto a non-metallic object surface as claimed in claim 1, characterized in that: a speed of the convey belt is adjusted by a variable speed motor.

3. The system for applying hot melt adhesive powder onto a non-metallic object surface as claimed in claim 1, characterized in that: a speed of the convey belt is adjusted by a driver.

4. The system for applying hot melt adhesive powder onto a non-metallic object surface as claimed in claim 1, characterized in that: each of the blowing devices is an air nozzle with adjustable directivity and flow intensity.

5. The system for applying hot melt adhesive powder onto a non-metallic object surface as claimed in claim 1, characterized in that: the heating chamber is further provided with a thermostat cooperating with a temperature sensor disposed in the heating chamber to control a temperature in the heating chamber.

6. The system for applying hot melt adhesive powder onto a non-metallic object surface as claimed in claim 1, characterized in that: the heating device in the heating chamber includes at least one infrared lamp.

* * * * *